United States Patent Office 3,584,067
Patented June 8, 1971

---

3,584,067
METHOD FOR MACROCYCLIC HYDROCARBONS
Paul R. Story, Athens, Ga., assignor to Research
Corporation, New York, N.Y.
No Drawing. Original application Jan. 15, 1968, Ser. No.
697,593, now Patent No. 3,528,898, dated Sept. 15,
1970. Divided and this application Jan. 9, 1970, Ser.
No. 10,121
Int. Cl. C07c 1/20
U.S. Cl. 260—666          5 Claims

ABSTRACT OF THE DISCLOSURE

Macrocyclic compounds are produced when cyclic ketone di- and triperoxides are decomposed by irradiation with ultraviolet light or by heating to a temperature above 100° C.

---

This application is a divisional application of my application Ser. No. 697,593, filed Jan. 15, 1968 now Pat. No. 3,528,898 issued Sept. 15, 1970.

This invention relates to a method for the preparation of macrocyclic componds. In one specific aspect, it relates to a method for the preparation of macrocyclic hydrocarbons and macrocyclic lactones.

It is known that dimeric and trimeric peroxides are formed by the action of hydrogen peroxide on cyclic ketones such as cyclohexanone. I have now discovered that the thermal or ultraviolet light induced decomposition of such peroxides yields macrocyclic hydrocarbons and/or macrocyclic lactones.

Accordingly, it is a principal object of the present invention to provide a convenient method for the preparation of macrocyclic hydrocarbons and macrocyclic lactones. This and other objects and advantages of the invention will become apparent on consideration of the discussion and examples which follow:

The dimeric and trimeric peroxides used in practicing the present invention are prepared as described in the literature:

Diperoxides
R. Criegee et al., Ann., 583, 6 (1953)
M. S. Kharasch et al., J. Org. Chem., 23, 1322 (1958)
T. Ledaal, Acta Chem. Scand., 21, 1656 (1967)

Triperoxides
R. Criegee et al., Ann., 565, 7 (1949)
W. Dilthey et al., J. Prakt. Chem., 154, 219 (1940)

In one embodiment of my invention, the reactant peroxide is decomposed thermally, for example, by heating in a sealed tube to a temperature above 100° C. or, more preferably, by direct injunction into a heated chromatographic column, or heated packed column of a standard pyrolysis type. In a second embodiment of my invention, the reactant peroxide, usually dissolved in a suitable organic solvent, is decomposed by irradiation with ultraviolet light from a mercury lamp or other convenient source.

The diperoxides decompose according to the overall equation:

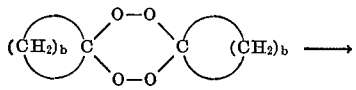

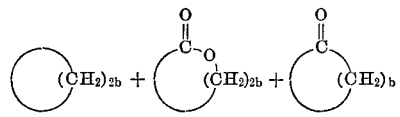

The diperoxide reactants are derived from cyclic ketones characterized by the presence of a 4-membered or larger ring. Thus, $b$ is an integer greater than 3 in the above equation.

The triperoxides decompose according to the equation:

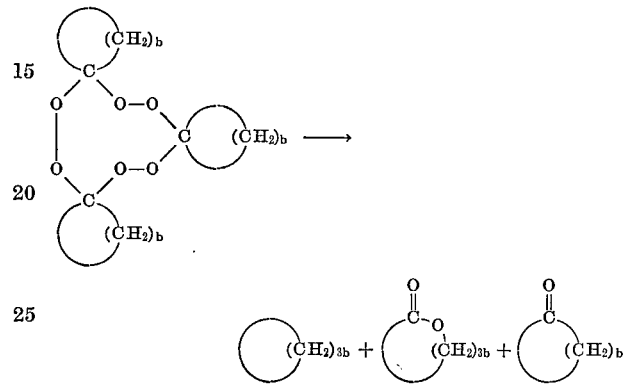

The triperoxide reactants are also derived from cyclic ketones characterized by the presence of a 5-membered or larger ring and $b$ is again an integer greater than 3.

Whereas both hydrocarbons and lactones are generally produced on decomposition of the peroxide reactants, the hydrocarbon usually predominates when ketone triperoxides are thermally decomposed. With either di- or triperoxides, a portion of the cyclic ketone used to prepare the peroxide reactant is usually recovered as a by-product of the decomposition reaction.

EXAMPLE 1—Decomposition of diperoxide

Caution: Peroxides may occasionally explode with considerable violence. If a small amount of solvent such as methanol or benzene is allowed to remain with the solid peroxides, explosions can generally be avoided.

(A) Five grams of cyclohexanone diperoxide was sealed under vacuum into a 300 milliliter ampoule and the ampoule heated at 150° C. for 30 minutes. After cooling to room temperature, the contents of the ampoule (now liquid) were separated and purified by preparative gas chromatography using a column of 20% silicone polymer on diatomaceous earth. There was obtained 1.17 grams (44% yield) of cyclodecane and 0.80 gram (23% yield) of 11-undecanolactone. About 21% of the diperoxide reactant was recovered as cyclohexanone. Similar results were obtained by injecting cyclohexanone diperoxide into a variety of chromatographic columns at 180° C.

(B) Twelve grams of cyclohexanone diperoxide dissolved in 4.5 liters of methanol (or benzene) was irradiated with ultraviolet light for 3 hours using a standard quartz Hanovia apparatus with a 450 watt lamp. After evaporation of the solvent using a rotary evaporator followed by chromatographic separation, there was obtained a 14% yield of cyclodecane and a 9% yield of 11-undecanolactone. About 20% of the diperoxide reactant was recovered as cyclohexanone.

(C) Using an approach similar to that employed in Part A, thermal decomposition of cycloheptanone diperoxide gave a 22% yield of cyclododecane and less than 1% of 13-tridecanolactone. About 33% of the diperoxide reactant was recovered as cycloheptanone.

(D) Using an approach similar to that employed in Part B, cycloheptanone diperoxide gave a 32% yield of cyclododecane and 7% of the lactone on irradiation with ultraviolet light. About 24% of the diperoxide reactant was recovered as cycloheptanone. A similar thermal decomposition of cyclodecanone diperoxide gave a 20% yield of cyclodocosane, 11% of 23-tricosanolactone and 9% of cyclododecane.

EXAMPLE 2—Decomposition of triperoxides (A) A solution containing 12 grams of cyclohexanone triperoxide in 4.5 liters of methanol was irradiated with ultraviolet light for 3 hours in a quartz apparatus using a 450 watt Hanovia lamp. The solvent was removed using a rotary evaporator and the product separated and purified by preparative gas phase chromatography. There was obtained 1.1 gram (15% yield) of cyclopentadecane, and 2.2 grams (25% yield) of 16-hexadecanolactone, also known as dihydroambrettolide. About 20% of the triperoxide reactant was recovered as cyclohexanone.

(B) Thermal decomposition of cyclohexanone triperoxide at 150° C. gave a 16% yield of cyclopentadecane and less than 1% of 16-hexadecanolactone. About 15% of the reactant triperoxide was recovered as cyclohexanone.

(C) Cyclopentanone triperoxide was thermally decomposed in a similar fashion to give a 20% yield of cyclododecane and a 2% yield of 13-tridecanolactone. About 24% of the triperoxide reactant was recovered as cyclopentanone. In this and the other examples given above, the identity of the reaction products isolated and confirmed by infrared, n.m.r. and mass spectral analyses.

The process of the present invention provides a method for the preparation of macrocyclic lactones of the musk compound type useful in perfumes. P. Z. Bedoukian, Amer. Perf. Cosmet., 80, 23 (1965), P. Z. Bedoukian, Perfumery Synthetics and Isolates, D. Van Nostrand, New York (1951).

The process of the present invention also provides a method for the preparation of macrocyclic hydrocarbons useful in the preparation of highly desirable musk ketones. For example, cyclopentadecane can be chlorinated or brominated in the presence of light, the resultant cyclopentadecanyl chloride or bromide hydrolyzed with weak alkali to cyclopentadecanyl alcohol, and the alcohol oxidized with dichromate to cyclopentadecanone, a compound having pure musk odor.

While the process of the present invention has been described with particular reference to the use of carbocyclic ketone peroxides as the reactants, the preparative reaction is also effective using heterocyclic ketones peroxides to make heterocyclic compounds, i.e., cyclic compounds wherein one or more of the methylene groups is replaced by a heteroatom such as oxygen. One or more methylene groups of the carbocyclic or heterocyclic ketone peroxide reactant may bear substituent groups such as hydroxy, halo, alkoxy, acyloxy, amido, amino or carboxyl, or alkyl or aryl groups bearing such substituent groups. When the substituents consist of hydroxy, carboxy, amino, hydroxyalkyl, carboxyalkyl, aminoalkyl, hydroxyaryl, carboxyaryl or aminoaryl groups, the resultant polyfunctional macrocycle is useful in the preparation of desirable elastomeric polyesters and polyamides.

The decomposition of substituted ketone peroxides according to the method of the present invention provides an alternate approach to the preparation of desirable musk compounds such as cyclopentadecanone. For example, the carbonyl groups (or a group capable of conversion to the carbonyl group or other desired group) can be built into the peroxide reactant prior to its decomposition as illustrated below:

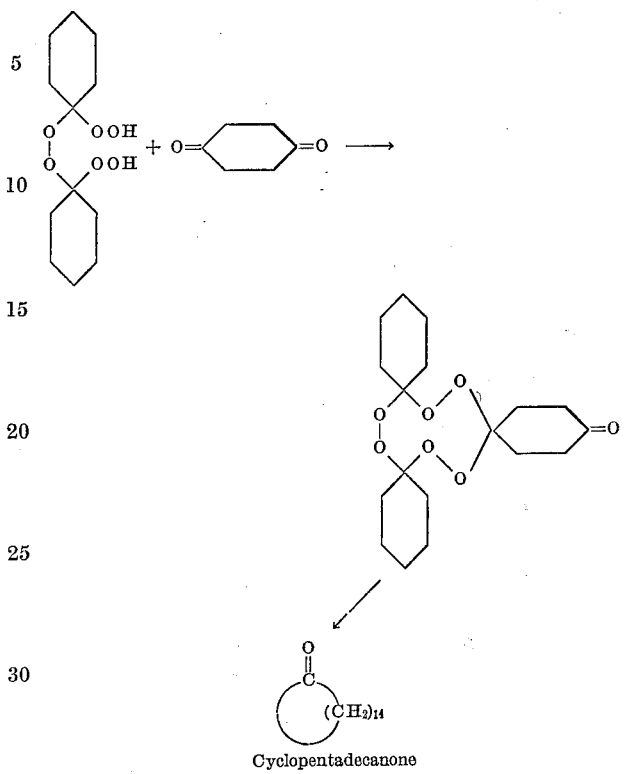

Cyclopentadecanone

Other variations falling within the scope of the present invention will suggest themselves to those skilled in the art and my invention is as claimed.

The work on which this application was based was financed in whole or in part by the Department of Health, Education and Welfare.

I claim:
1. A method for the perparation of macrocyclic compounds of the formula

wherein $a$ is 2 or 3 and $b$ is greater than 3 which comprises decomposing di- and triperoxides of the formula

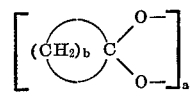

wherein $a$ and $b$ have the values above, by heating to a temperature above 100° C.

2. A method according to claim 1 wherein cyclodecane is prepared by the decomposition of cyclohexanone diperoxide.

3. A method according to claim 1 wherein cyclopentadecane is prepared by the decomposition of cyclohexanone triperoxide.

4. A method according to claim 1 wherein cyclododecane is prepared by the decomposition of cycloheptanone diperoxide.

5. A method according to claim 1 wherein cyclododecane is prepared by the decomposition of cyclopentanone triperoxide.

References Cited

FOREIGN PATENTS 1,533,936    6/1968    France _____ 260—343

DELBERT E. GANTZ, Primary Examiner

V. O'KEEFE, Assistant Examiner